United States Patent [19]

Ryu et al.

[11] Patent Number: 5,749,241
[45] Date of Patent: May 12, 1998

[54] FREEZER COMPARTMENT STRUCTURE FOR REFRIGERATORS

[75] Inventors: Sang Chul Ryu; Ik Geun Kim, both of Suwon, Rep. of Korea

[73] Assignee: Samsung Electronics Co., Ltd., Suwon, Rep. of Korea

[21] Appl. No.: 722,495

[22] Filed: Sep. 27, 1996

[30] Foreign Application Priority Data

Dec. 29, 1995 [KR] Rep. of Korea ............... 1995-65559

[51] Int. Cl.[6] .......................................... F25C 1/00
[52] U.S. Cl. .................. 62/340; 248/222.41; 312/408; 403/319
[58] Field of Search ................ 62/382, 465, 340; 248/27.1, 222.41; 312/245, 404, 408; 403/316, 319, 353

[56] References Cited

U.S. PATENT DOCUMENTS

| | | | |
|---|---|---|---|
| 2,450,337 | 9/1948 | Hearst | 312/245 |
| 2,704,927 | 3/1955 | Carrell | 62/382 |
| 3,159,368 | 12/1964 | Ahlbin et al. | 248/222.41 |
| 3,169,813 | 2/1965 | Cannon et al. | 312/270 |
| 3,443,851 | 5/1969 | Earl | 312/245 |
| 4,633,789 | 1/1987 | Kortering et al. | 312/245 |
| 4,960,308 | 10/1990 | Donaghy | 312/245 |

*Primary Examiner*—William E. Tapolcai
*Attorney, Agent, or Firm*—Burns, Doane, Swecker & Mathis, L.L.P.

[57] ABSTRACT

A shelf structure for a freezer compartment of a refrigerator includes a horizontal shelf and a base removably supported by an underside of the shelf. The shelf includes downward projections received in holes formed in a top wall of the base. Each projection incudes a narrow part and a wide part disposed at a lower end of the narrow part. The base rests upon the wide parts. Each hole includes an insert portion and a locking portion. The projections are passed vertically through the insert portion and are then moved horizontally into the locking portion. A portion of an edge of the hole is elastic to enable the narrow part to enter the locking portion and then to elastically retain the narrow part therein.

11 Claims, 4 Drawing Sheets

FIG. 3
(PRIOR ART)
FIG. 4
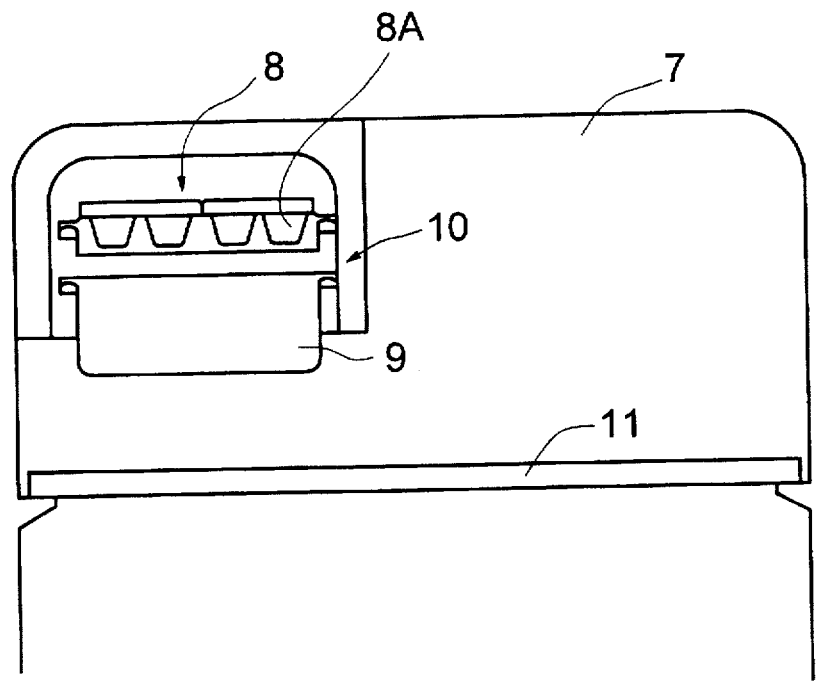
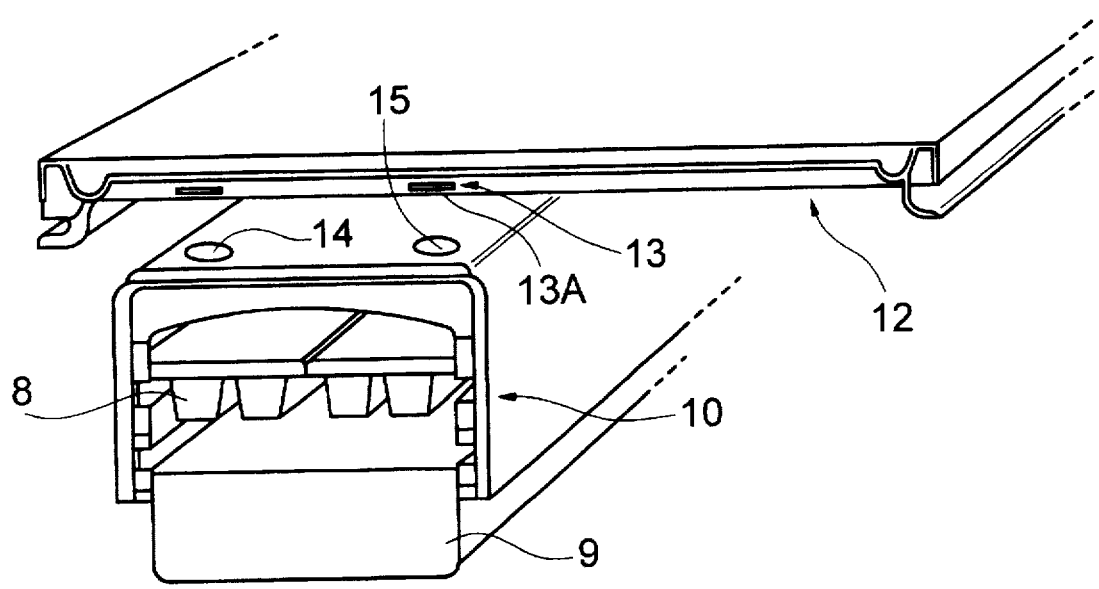

FREEZER COMPARTMENT STRUCTURE FOR REFRIGERATORS

BACKGROUND OF THE INVENTION

1. Field of the Invention

The present invention relates, in general, to a freezer compartment structure for refrigerators.

2. Description of the Prior Art

A typical refrigerating system for refrigerators is schematically shown in FIG. 1. As shown in the drawing, the typical refrigerating system includes a compressor 4, which receives low temperature and low pressure refrigerant gas through a suction pipe 1 and compresses the refrigerant gas in order to provide high temperature and pressurized refrigerant gas and supplies the pressurized hot refrigerant gas to a condenser 3. The above refrigerating system also includes a capillary tube 5, wherein the pressurized hot refrigerant gas emits heat to the atmospheric air so that the refrigerant gas is condensed and becomes liquid refrigerant. The refrigerating system further includes an evaporator 6, wherein the low temperature liquid refrigerant absorbs heat from air thus cooling the air. The cold air generated by the evaporator 6 is distributed into the freezer and refrigeration compartments of a refrigerator by a blower.

The cold air generated by the evaporator of the above refrigerating system is sucked into the freezer and refrigeration compartments by the suction force of a fan and repeatedly circulates inside the compartments. The fan is exclusively turned on when a freezer thermostat, which automatically controls the temperature inside the freezer compartment, is turned on.

FIG. 2 shows the construction of a conventional refrigerator. As shown in FIG. 2, the conventional refrigerator includes a freezer compartment 21, which is typically formed inside the cabinet at a position above the evaporator 6. In the freezer compartment 21, a base 10 and a food holding shelf 11 are installed. In addition, three compartments, that is, a vegetable compartment 22, a fresh food compartment 23 and a refrigeration compartment 24, are formed inside the cabinet under the evaporator 6. The vegetable and fresh food compartments 22 and 23 are provided inside the refrigeration compartment 24. Each of the vegetable and fresh food compartments 22 and 23 maintains the appropriate temperature and an appropriate percentage of humidity and thereby maintains the freshness of food, which is stored in the compartment, for a lengthy period of time. A plurality of shelves 29 are provided in the refrigeration compartment 24.

A part of the cold air, which is sucked from the evaporator 6 by the suction force of a motor fan 25, is introduced into the freezer compartment 21 through a passage bordered by a wall or inner cabinet 26 of the freezer compartment 21. The fan 25 is operated by a freezer thermostat (not shown), which automatically controls the temperature inside the freezer compartment 21. The other part of the cold air of the evaporator 6 is introduced into the refrigeration compartment 24 through a passage bordered by a wall or inner cabinet 28 of the refrigeration compartment 24. In this case, the amount of cold air introduced into the refrigeration compartment 24 is controlled by a damper 27, which is installed at a predetermined position inside the compartment 24.

FIG. 3 shows the construction of a conventional freezer compartment of a refrigerator. As shown in FIG. 3, a base 10 is fixedly mounted to a corner of the freezer compartment cabinet 28 by a plurality of set screws (not shown). In addition, a shelf 11 is horizontally installed inside the freezer compartment at a predetermined position under the base 10 and is used for holding food to be stored inside the freezer compartment.

The fixed base 10 detachably holds a plurality of movable ice cube trays 8 and a slidable ice bin 9. The ice cube trays 8, which make ice cubes, are mounted to a slidable case so that the trays 8 are rotatably movable relative to the case. The ice bin 9, which is used for containing the formed ice cubes dispensed from the trays 8, is slidably mounted to the base 10 at a position under the trays 8.

However, the above freezer compartment has a problem in that the space inside the freezer compartment cannot be effectively used since the fixed base 10 with the ice cube trays 8 and ice bin 9 always occupies a sizable space inside the freezer compartment.

Japanese U.M. Laid-open Publication No. Sho. 53-161366 disclosed a freezer compartment which has a fixed shelf integrally extending from the base in an effort to more effectively use the limited space inside the freezer compartment.

However, the above Japanese freezer compartment has a problem in that the base 10 must be fixed to a predetermined position on the freezer compartment cabinet 7 by means of set screws. Therefore, the number of elements of the freezer compartment is increased thus wasting labor, reducing work efficiency and taking too long while the elements are assembled into the freezer compartment. Another problem of the above Japanese freezer compartment resides in that the fixed shelf cannot slide inside the freezer compartment.

SUMMARY OF THE INVENTION

It is, therefore, an object of the present invention to provide a freezer compartment structure for refrigerators in which the above problems can be overcome and of wherein the base which carries the ice cube trays and the ice bin is detachably attached to the shelf of the freezer compartment without using separate set screws thus allowing a user to effectively use the limited space inside the freezer compartment by selectively removing the base from the shelf and from the freezer compartment.

In order to accomplish the above object, a freezer compartment structure for refrigerators in accordance with the invention comprises a horizontal shelf adapted for holding food thereon, a base detachably attached to the underside of the shelf and adapted for detachably holding both an ice cube tray and an ice bin therein, and a means for detachably attaching the base to the shelf.

In the preferred embodiment, the attaching means comprises a fitting member integrally extending from the underside of the shelf as a single body therewith, and a connecting hole formed on the top wall of the base and detachably engaging with the fitting member in order to detachably attach the base to the shelf. The connecting hole has insert and locking parts, which are used for inserting and locking the fitting member, respectively.

The connecting hole is provided with a flexible peninsular member defining an edge of the locking part. The peninsular member elastically holds the fitting member in the locking part thus resisting an undesirable separation of the fitting member from the hole.

Both the peninsular member and the junction between the insert and locking parts of the hole are provided with an incline for allowing the base to be easily attached to the fitting member.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a front view showing the construction of a conventional freezer compartment for refrigerators;

FIG. 4 is an exploded perspective view showing the construction of a freezer compartment with a base detachably attached to the shelf in accordance with the preferred embodiment of the present invention;

DESCRIPTION OF THE PREFERRED EMBODIMENT

Figure 1:
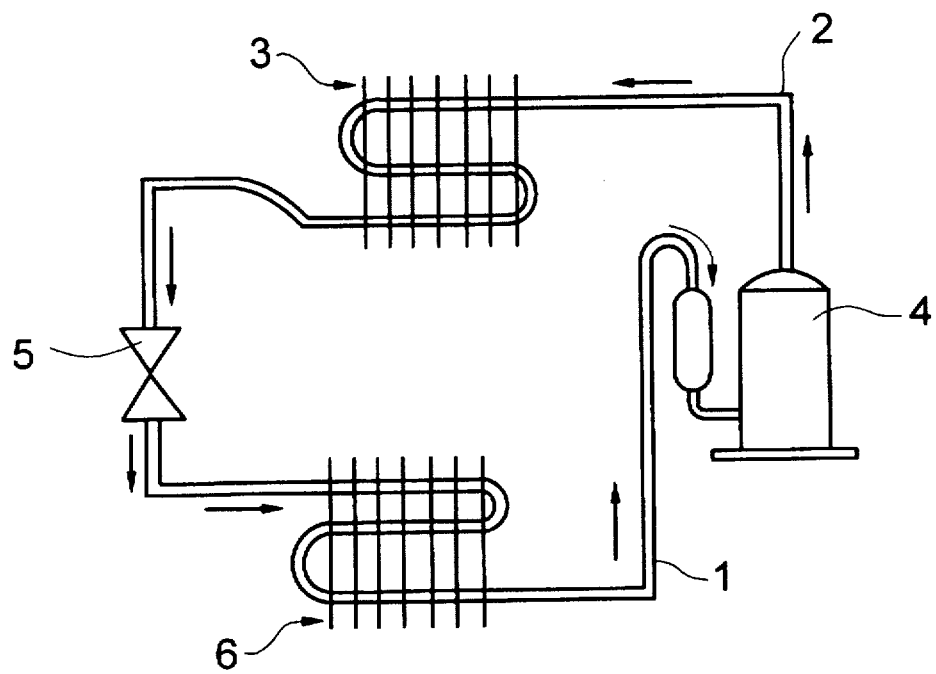
FIG. 1 is a schematic diagram showing the construction of a conventional refrigerating system for refrigerators.
Figure 2:
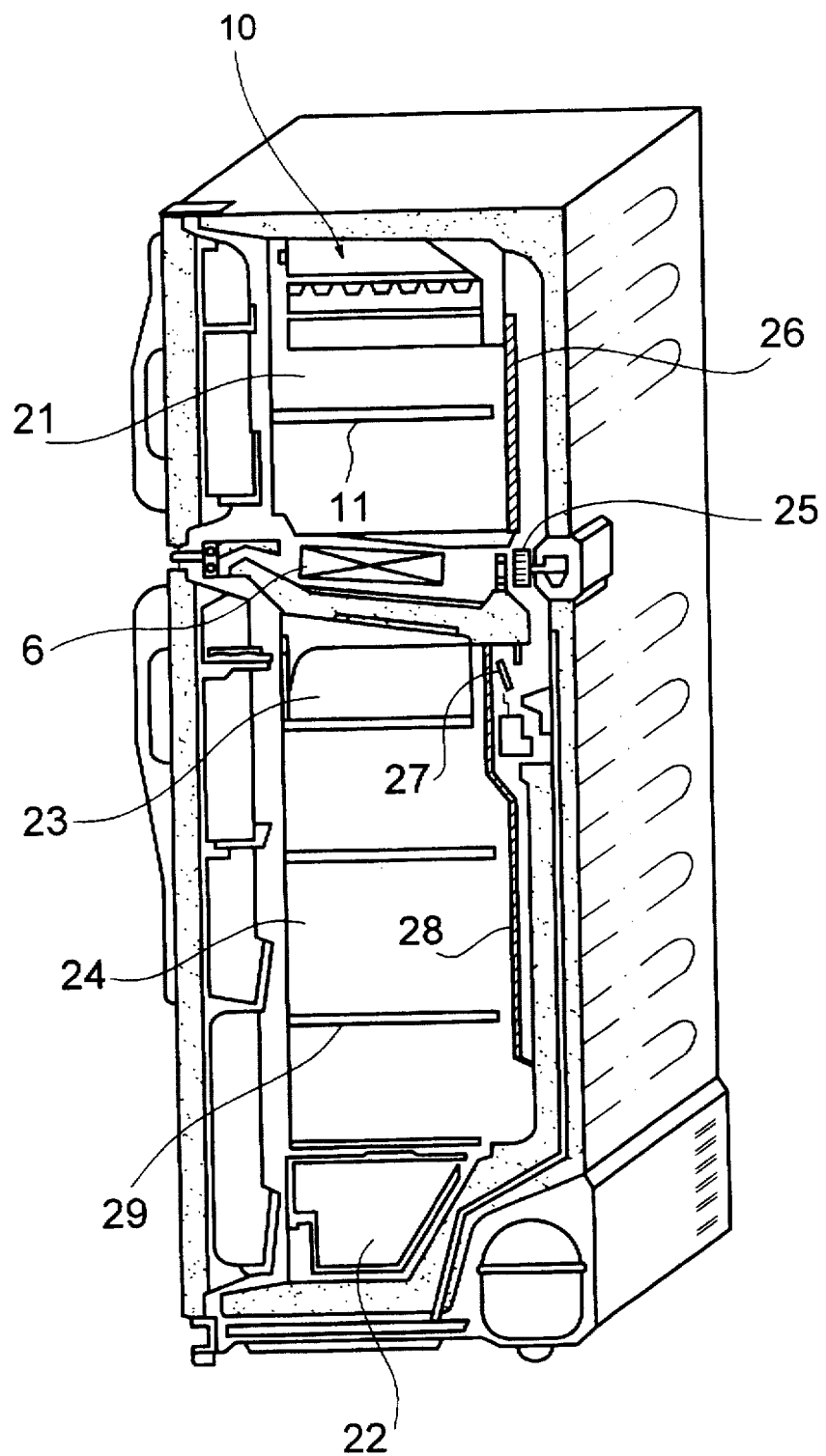
FIG. 2 is a perspective view showing the construction of a conventional refrigerator.
Figure 5A:
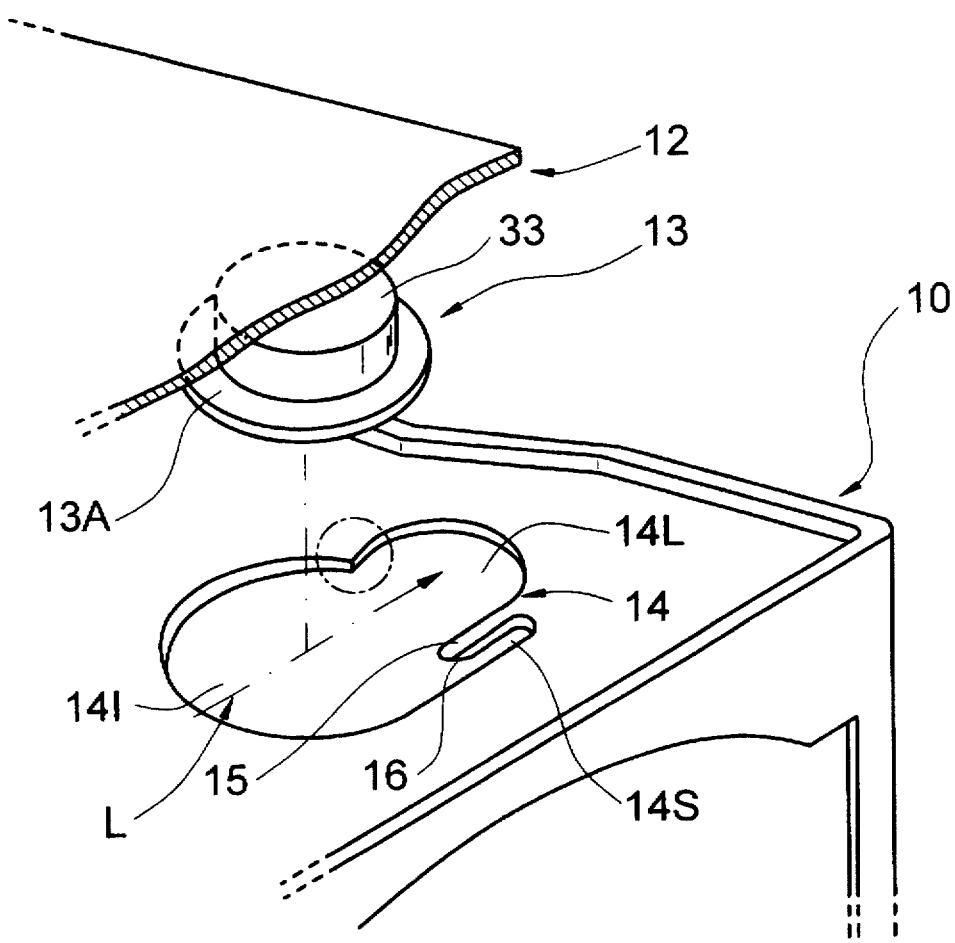
FIG. 5A is a perspective exploded view showing the construction and configuration of the means for detachably attaching the base to the shelf of the freezer compartment of this invention and FIG. 5B is an enlarged fragmentary view of a neck portion of a hole 14 circled in FIG. 5A.
Figure 5B:
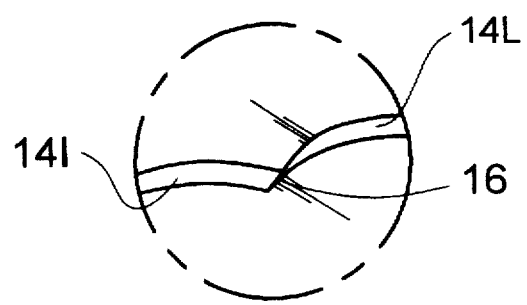

FIG. 4 shows the construction of a freezer compartment with a base detachably attached to a shelf in accordance with the preferred embodiment of this invention. FIG. 5 shows the construction and configuration of the means for detachably attaching the base to the shelf of the freezer compartment. As shown in FIGS. 4 and 5, a slidable shelf 12 is provided which is held on guide rails (not shown) formed on the cabinet of the freezer compartment. The base attaching means for detachably attaching the base 10 to the shelf 12 includes a plurality of fitting members or projections 13, which are integrated with the underside of the shelf 12 into a single body. The free end of each fitting member 13 is flanged to form a circular wide protrusion 13A situated at the bottom of a narrow portion 13B. The base attaching means also includes a plurality of connecting holes 14. The connecting holes 14 are formed in the top wall of the base 10 and detachably engage with the respective fitting members 13 of the shelf 12 when the base 10 is attached to the shelf 12. Each connecting hole 14 comprises two parts, that is, an insert part 14I and a locking part 14L which are used for inserting and locking the respective fitting member 13. The larger-diameter insert part of the hole 14 communicates with the smaller-diameter locking part through a neck portion 16. The neck portion is shown in detail in FIG. 5A.

A portion of each connecting hole 14 disposed opposite the neck portion 16 has a slit 14S extending parallel to a longitudinal axis L of the hole 14; so that a flexible peninsular member 15 forms a part of the edge of the locking part of the hole 14. The peninsular member 15 elastically holds the fitting member 13 in the locking part 14I of the hole 14 so that the fitting member 13 is less likely to be suddenly separated from the hole 14. The neck portion 16 is defined by an intersection of the insert and locking parts 14I, 14L of the hole, and is inclined downwardly away from the axis L as shown in detail in FIG. 5B. An incline 16 is also formed on the underside of the flexible peninsular member 15. Due to those inclines the fitting members 13 smoothly move between the insert and locking parts of the connecting holes 14 so that the base 10 can be easily attached to or removed from the shelf 12.

The base 10 detachably holds the ice cube trays 8 and ice bin 9 in the same manner as described for the prior art freezer compartment.

The operational effect of the above freezer compartment structure will be described hereinbelow.

In order to install the base 10 and shelf 12 inside the freezer compartment, the shelf 12 is primarily held on guide rails of the freezer compartment cabinet. Thereafter, the base 10 is detachably attached to the underside of the shelf 12 in the following manner. That is, the base 10 is arranged on the underside of the shelf 12 prior to moving the larger-diameter insert parts of the connecting holes 14 vertically through the respective fitting members 13. Thereafter, the base 10 is horizontally moved relative to the shelf 12 so that each fitting member 13 is fitted into the small-diameter locking part of an associated connecting hole 14 after passing the neck portion 16. In this case, the flexible peninsular member 15 of each hole 14 is elastically biased outward by the fitting member so that the member 15 then holds the fitting member 13 inside the locking part of the hole 14. The fitting members 13 received in the smaller-diameter locking parts of the holes 14 cannot be suddenly removed from the locking parts as the base rests upon the circular fitting protrusions 13A. In this regard, the base 10 is less likely to be undesirably separated from the shelf 12.

The neck portion 16 and the flexible peninsular member 15 of each hole 14 are set at an incline so that the fitting members 13 smoothly move between the insert and locking parts of the holes 14. The base 10 can be thus easily attached to or removed from the shelf 12. The flexible peninsular member 15 elastically bears against the fitting member 13 so that the fitting member 13 is tightly held in the locking part 14L by the peninsular member 15 and is less likely to be separated from the locking part.

Since the base 10 is detachably attached to the shelf 12 as described above, users can more effectively use the limited space inside the freezer compartment by selectively removing the base 10 from the freezer compartment.

As described above, the present invention provides a freezer compartment structure for refrigerators in which the base with both the ice cube trays and the ice bin is detachably attached to the shelf without using separate set screws. Therefore, the freezer compartment structure of this invention reduces the number of elements of the freezer compartment and allows a user to effectively use the limited space inside the freezer compartment by selective removing the base from the freezer compartment.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A refrigerator freezer compartment comprising:
   a horizontal shelf adapted to support food;
   an ice cube tray and an ice cube storage bin;
   a base detachably receiving said ice cube tray and said ice cube storage bin; and
   attaching means for detachably attaching said base to an underside of said shelf whereby said base is supported by said shelf.

2. The refrigerator freezer compartment according to claim 1 wherein said attaching means comprises first means integral with said shelf and second means integral with said base.

3. The refrigerator freezer compartment according to claim 2, wherein one of the first and second means comprises a projection, and the other of said first and second means comprises a hole for receiving said projection.

4. The refrigerator freezer compartment according to claim 3, wherein said projection includes a wide portion and a narrow portion; said hole including an insert portion large enough to enable said wide portion to pass vertically therethrough, and a locking portion smaller than said insert portion and large enough to enable said narrow portion to pass horizontally thereinto.

5. The refrigerator freezer compartment according to claim 4, wherein a portion of an edge of said hole includes an elastic part which is flexible to elastically retain said narrow portion in said locking portion.

6. The refrigerator freezer compartment according to claim 5, wherein said hole includes a slot, said elastic part situated between said locking portion and said slot, and extending in a horizontal direction.

7. The refrigerator freezer compartment according to claim 3, wherein said first means comprises said projection, and said second means comprises said hole.

8. A shelf structure adapted for use in a freezer compartment of a refrigerator, comprising a horizontal shelf adapted to support food; a base adapted for detachably receiving an ice cube tray and an ice cube storage bin; and attaching means for detachably attaching said base to an underside of said shelf whereby said base is supported by said shelf; wherein said attaching means comprises a fitting member extending downwardly from an underside of said shelf and being of one piece with said shelf, and a hole formed in a top wall of said base, said hole including an insert portion for vertically receiving said fitting member, and a locking portion for horizontally receiving said fitting member.

9. The shelf structure according to claim 8, wherein an edge of said hole includes an elastic portion which is flexible to elastically resist horizontal dislodgement of said fitting member from said locking portion.

10. The shelf structure according to claim 9, wherein an intersection of said insert and locking portions is inclined to facilitate passage of said fitting member into said locking portion.

11. A refrigerator comprising:

a housing forming a freezer compartment; and a shelf structure disposed in said freezer compartment, comprising:

a horizontal shelf adapted to support food, said shelf including downwardly dependent projections each including a narrow portion, and a wide portion disposed at a lower end of said narrow portion;

a base supported by said shelf, said base including holes for receiving respective ones of said projections, each hole including an insert portion sized to enable said wide portion to pass vertically therethrough, and a locking portion smaller than said insert portion and large enough to enable said narrow portion to slide horizontally thereinto, said locking portion being smaller than said wide portion to enable said base to rest on said wide portion, a portion of an edge of said hole including an elastic part which elastically retains said narrow portion in sid locking portion; and an ice cube tray and an ice cube storage bin removably supported in said base.

* * * * *